United States Patent
Yoda et al.

Patent Number: 5,080,332
Date of Patent: Jan. 14, 1992

[54] STRUCTURE OF VIBRATION-PROOF RUBBER BUSHING

[75] Inventors: Norio Yoda; Yoshinari Fujiwara; Singo Tanuma, all of Chiba, Japan

[73] Assignee: Kinugawa Rubber Industrial Co., Ltd., Japan

[21] Appl. No.: 702,127

[22] Filed: May 16, 1991

Related U.S. Application Data

[63] Continuation of Ser. No. 440,651, Nov. 24, 1989, abandoned.

[30] Foreign Application Priority Data

Nov. 25, 1988 [JP] Japan ................. 63-297359

[51] Int. Cl.$^5$ .................. F16F 13/00; F16F 1/38
[52] U.S. Cl. .................. 267/140.1 C; 180/312; 248/562; 248/636; 267/219; 267/140.1 A
[58] Field of Search ........... 267/140.1 R, 140.1 C, 267/140.1 A, 219, 220; 180/300, 312, 902; 248/562, 636, 635

[56] References Cited

U.S. PATENT DOCUMENTS

| | | | |
|---|---|---|---|
| 4,141,572 | 2/1979 | Sorensen | 267/64.21 X |
| 4,424,960 | 1/1984 | Dan et al. | 267/219 |
| 4,611,795 | 9/1986 | Muzechuk | 267/140.1 A |
| 4,623,135 | 1/1986 | Ray | 267/140.1 A |
| 4,667,749 | 5/1987 | Keller | 267/140.1 X |
| 4,705,410 | 1/1987 | Broock | 267/219 X |
| 4,749,174 | 6/1988 | Kanda | . |
| 4,771,990 | 9/1988 | Domer et al. | . |
| 4,854,561 | 8/1989 | Kanda | 248/562 X |
| 4,893,799 | 1/1990 | Fontenay | 180/312 X |
| 4,936,556 | 6/1990 | Makibayashi et al. | 267/140.1 |

FOREIGN PATENT DOCUMENTS

| | | | |
|---|---|---|---|
| 0242254 | 10/1987 | European Pat. Off. | . |
| 3721175 | 1/1988 | Fed. Rep. of Germany | . |
| 61-223344 | 10/1986 | Japan | . |
| 312535 | 12/1988 | Japan | 267/140.1 C |
| 2192968 | 1/1988 | United Kingdom | . |

*Primary Examiner*—George E. Halvosa
*Attorney, Agent, or Firm*—Ronald P. Kananen

[57] ABSTRACT

A structure of a vibration-proof rubber bushing with a high loss factor and high durability is disclosed which comprises a) a metallic outer envelope; b) a viscous fluid preferably of a liquid such as silicone oil filled in the outer envelope; c) a first elastic member; and d) a metallic inner envelope fitted into an inner portion of the outer envelope via the first elastic member.

11 Claims, 5 Drawing Sheets

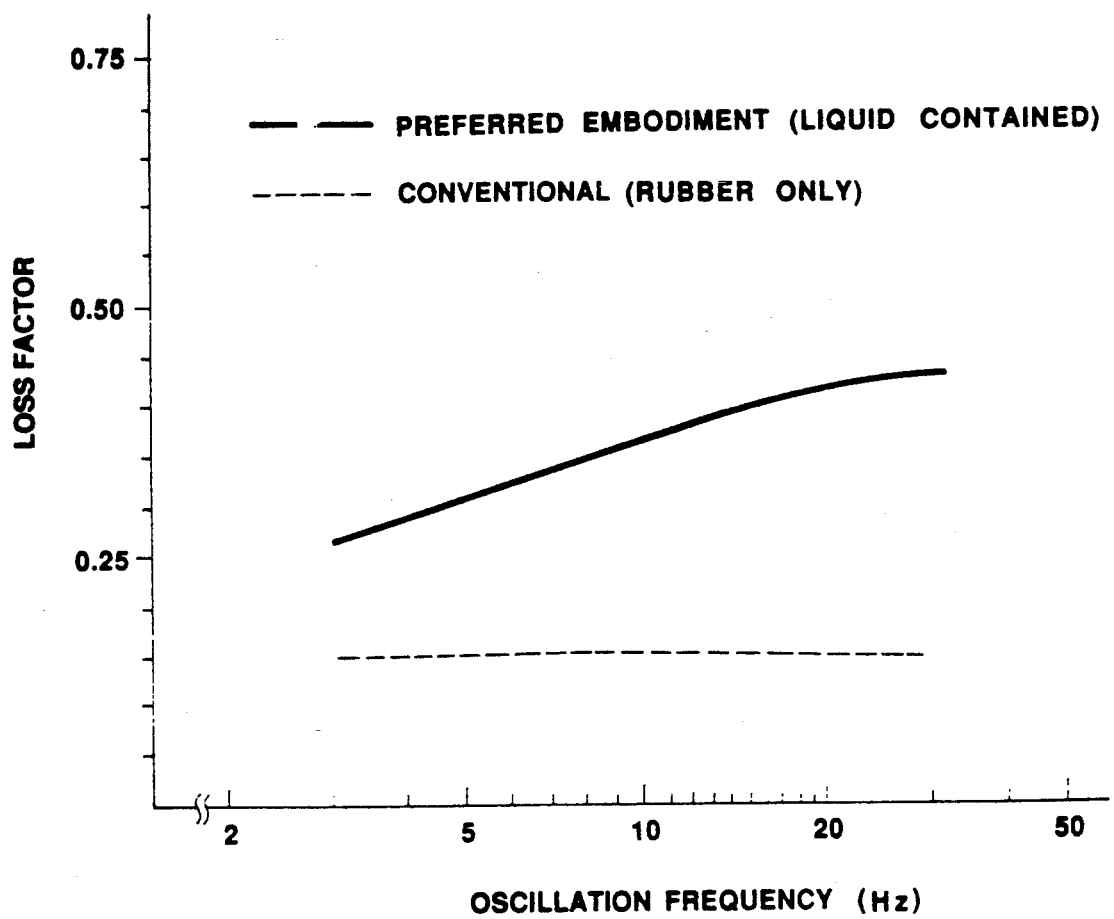

STRUCTURE OF VIBRATION-PROOF RUBBER BUSHING

This application is a continuation of application Ser. No. 07/440,651 filed Nov. 24, 1989, now abandoned.

BACKGROUND OF THE INVENTION (1) Field of the Invention

The present invention relates to a structure of a vibration-proof rubber bushing used for supporting a vibration-proof material of such as a suspension of an automotive vehicle.

(2) Description of the Background Art

For example, a compression rod bushing has often been used to support a compression rod installed on one end of a transverse link of an automotive vehicle on a vehicle body.

The compression rod bushing described above is exemplified by a Japanese Patent Application First Publication Showa 61-223344 published on Oct. 3, 1986.

The compression rod bushing is formed with a U-shaped of cross section and is made of a rubber material. An inserting hole for inserting the compression rod thereinto is provided in its inner portion.

Hence, in a case where the compression rod is vibrated in its axial direction or in a direction transverse to the axial direction, the rubber material of the bushing absorbs the vibration described above to achieve an improvement in its shimmy prevention performance.

The structure of the compression rod bushing described above is advantageous in that the transverse link can elastically be supported by a mere insertion of the compression rod into the bushing. However, it has a problem in that in the case where a single kind of rubber material is used, a limit is present in increasing a loss factor (to be described later) so that a desired vibration-proof characteristic cannot be achieved.

On the other hand, although a relatively high loss factor can be achieved if a plurality of rubber materials are blended, a desired durability for the bushing cannot be achieved.

SUMMARY OF THE INVENTION

It is an object of the present invention to provide a structure of a vibration-proof rubber bushing which can achieve both a high loss factor and a high durability.

The above-described object can be achieved by providing a structure of a vibration-proof rubber bushing, comprising: a) a metallic outer envelope; b) a viscous fluid filled in the outer envelope; c) a first elastic member; and d) a metallic inner envelope fitted into an inner portion of the outer envelope via the first elastic member.

The above-described object can also be achieved by providing a structure of a vibration-proof rubber bushing for a vehicle, comprising: a) an outer envelope having a bottom; b) a liquid contained in the outer envelope; and c) an inner envelope through which a rod end of a vibrating member is inserted and fixed and fitted into the outer envelope via an elastic member.

BRIEF DESCRIPTION OF THE DRAWINGS

FIG. 9 is a characteristic graph of the compression rod rubber bushing in a Q direction in FIG. 3.

DETAILED DESCRIPTION OF THE PREFERRED EMBODIMENT

Reference will hereinafter be made to the drawings in order to facilitate a better understanding of the present invention.

Figure 3:
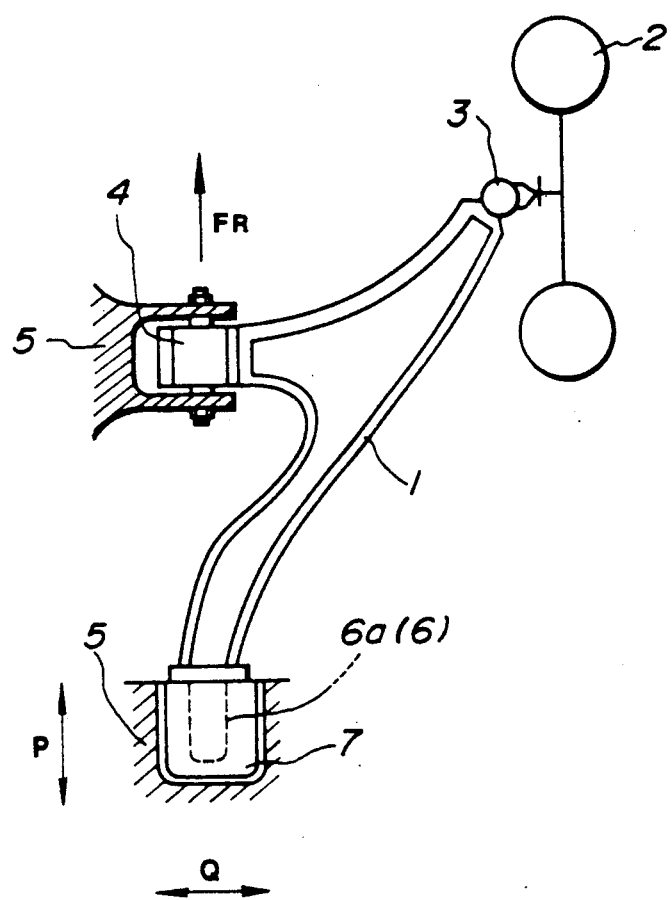
FIG. 3 is an elevational view of a transverse link of a suspension of an automotive vehicle.

FIG. 3 shows a transverse link of an automotive vehicle to which the present invention is applicable.

In FIG. 3, the transverse link 1 is used as a vibration member and constitutes a part of a vehicle suspension. In FIG. 3, a symbol $F_R$ with an arrow denotes a front side direction of the vehicle.

The transverse link 1 has a ball joint 3 at an outside thereof, the ball joint 3 supporting a wheel 2. An inner front portion thereof is supported on a vehicle body 5 via a transverse link bush 4. A compression rod 6 is installed at an inner rear portion thereof.

Figure 1:
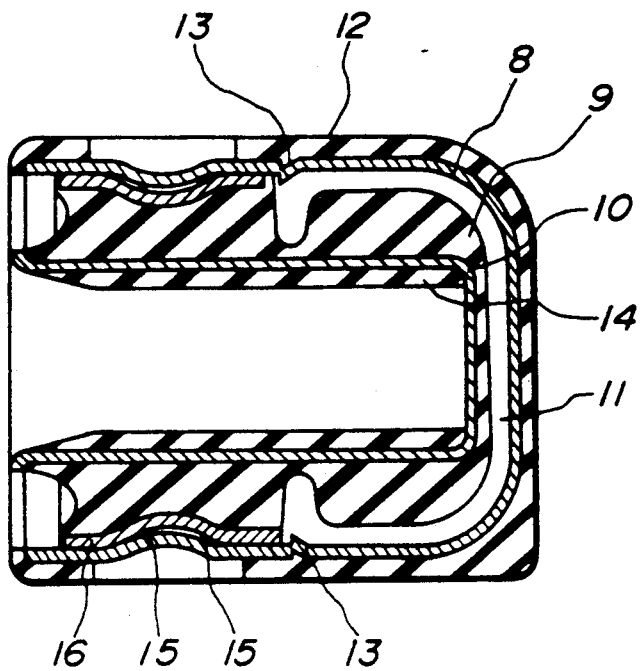
FIG. 1 is a longitudinally cross-sectioned view of a compression rod rubber bushing in a preferred embodiment according to the present invention.
Figure 2:
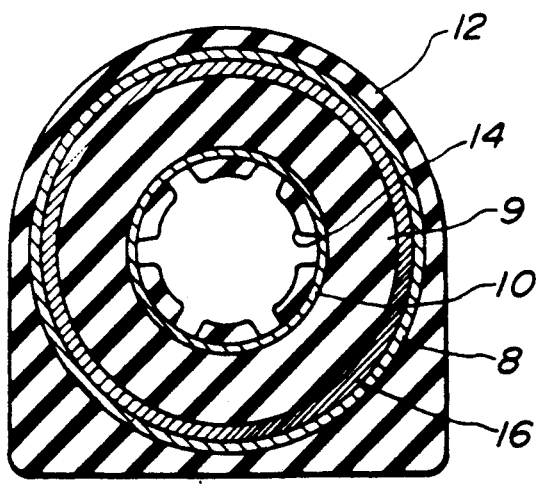
FIG. 2 is a laterally cross-sectioned view of the same as shown in FIG. 1.

The compression rod 6 is supported on a compression rod bushing 7 serving as a vibration-proof rubber bushing installed on the vehicle body 5. The compression rod bushing 7 has, as shown in FIGS. 1 and 2, a U shaped outer envelope 8 in which an inner envelope 10 is fitted, the inner envelope 10 being coated with an elastic member 9. In addition, a silicone oil 11 as a liquid is filled in a space between the elastic member 9 and outer envelope 8. A rod end 6a of the compression rod 6 is inserted and fixed within the inner envelope 10.

Figure 4:
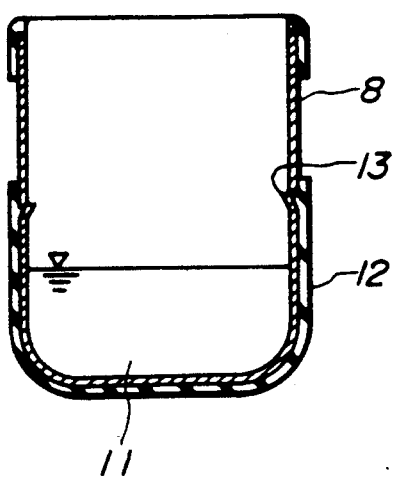
FIG. 4 is a cross-sectioned view of an inner cylindrical envelope of the compression rod rubber bushing shown in FIGS. 1 and 2.

The outer envelope 8 is, specifically as shown in FIG. 4, coated with a rubber member 12 at an outer periphery of the outer envelope 8. The silicone oil 11 is contained in the outer envelope 8 of a metallic member having a bottom and provided with an engaging pawl 13 at a predetermined position of its inner peripheral surface.

Figure 5:
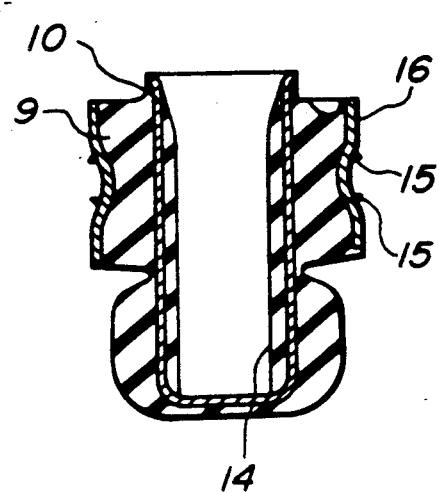
FIG. 5 is a cross-sectioned view of an outer cylindrical envelope of the compression rod rubber bushing shown in FIGS. 1 and 2.

On the other hand, an elastic member 9 is fixed to the inner envelope 10, as shown in FIG. 5. In addition, the inner envelope 10 is a metallic member having a bottom in which rubber projections 14 are installed at its inner peripheral surface. A ring member 16 is attached having seal projections 15 tightly contacted with the inner peripheral surface of the outer envelope 8. A portion of the inner envelope 10 placed between each seal projection 15 of the ring member 16 is bent toward the inner portion thereof.

Figure 6:
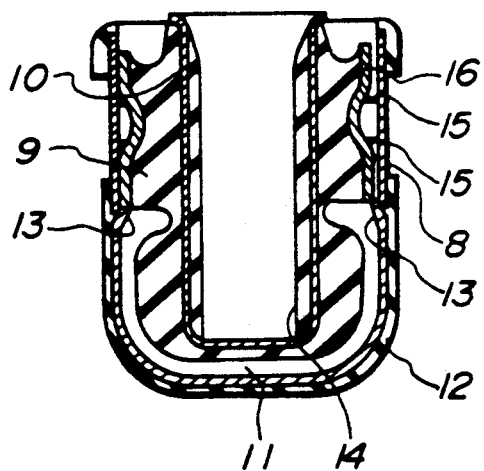
FIG. 6 is a longitudinal cross-sectioned view of the bushing in which the inner cylindrical envelope shown in FIG. 4 is inserted into the outer cylindrical envelope shown in FIG. 5.
Figure 7:
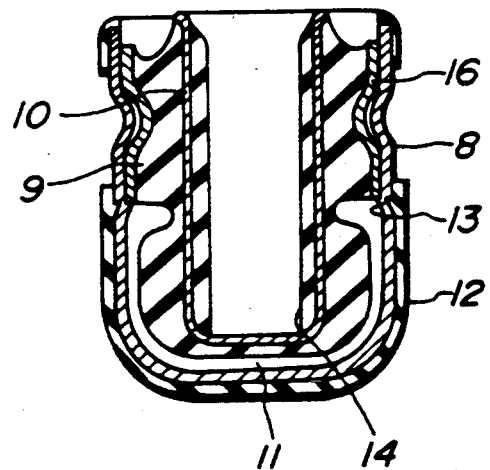
FIG. 7 is a longitudinally cross-sectioned view after assembly of the compression rod rubber bushing.

After the inner envelope 10 is fitted into the outer envelope 8 in which a slightly larger amount of silicone oil 11 than a limited amount thereof is contained, as shown in FIG. 6, the corresponding outer envelope 8 is drawn between each seal projection 15 of the inner envelope 10, as shown in FIG. 7, so that the compression rod bushing 7 is formed which contains the silicone oil.

Since the ring member 16 is engaged with the engagement pawl 13 installed on the outer envelope 8, the inner envelope 10 is set at the predetermined position of the outer envelope 8. In addition, since the outer envelope 8 is drawn so that the seal projections 15 of the inner envelope 10 are brought in close contact with the inner periphery of the outer envelope 8, the silicone oil 11 is completely sealed.

It is noted that when the inner envelope 10 is fitted into the outer envelope 8, a part of the silicone oil 11 which is contained within the outer envelope 9 by the larger amount than the limited amount overflows as an extra amount of the silicone oil. Hence, no invasion of air into the outer envelope 8 occurs.

Figure 8:
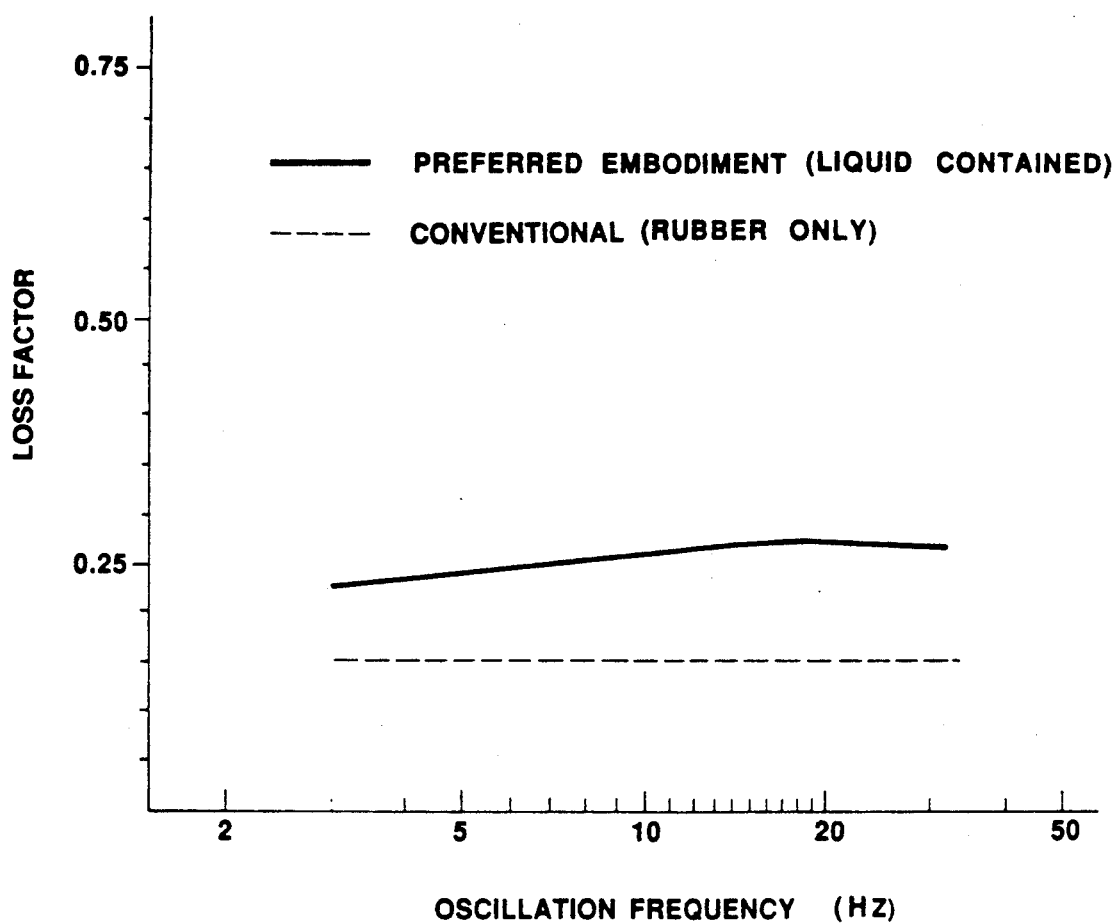
FIG. 8 is a characteristic graph of the compression rod rubber bushing in a P direction in FIG. 3.

An experiment indicated the formed compression rod bushing 7 provides a higher loss factor than that having no silicone oil 11 as shown in FIGS. 8 and 9 since the compression rod bushing 7 is filled with the silicone oil.

The loss factor × is defined as $2C/C_c$ ($= Cà/k_1$), wherein C denotes a viscous damping coefficient of the rubber, $C_c$ denotes a critical damping coefficient defined as $$2\sqrt{mk_1}$$

(wherein m denotes a mass of a rubber bushing and $k_1$ denotes a stifness of spring or dynamic spring constant of the rubber bushing), and à denotes a circular frequency.

In more detail, for a P direction in FIG. 3, i.e., the axial direction of the compression rod 6, the rubber bushing in which the silicone oil 11 is sealed (denoted by a solid line of FIG. 8) had a larger loss factor than the rubber bushing in which no silicone oil is sealed (denoted by a broken line), as shown in FIG. 8 (in which a longitudinal axis denotes the loss factor and a lateral axis denotes a vibration frequency).

For the direction transverse to the axial direction of the compression rod 6, the same result as shown in FIG. 8 has been indicated as shown in FIG. 9.

Hence, the compression rod bushing 7 in the preferred embodiment can achieve a remarkable improvement in its shimmy performance.

In addition, in the preferred embodiment described above, the sealing operation of the silicone oil 11 is simple. Since the silicone oil 11 is securely sealed by means of the seal projections 15 and the sealed amount can become constant, the reliability becomes high.

Since the construction is simple and the number of parts is reduced, the manufacturing cost can be reduced.

The present invention can be applied to various kinds of vibration-proof members.

As described hereinabove, the structure of the vibration-proof rubber bushing can have a high loss factor when the liquid described above is filled therein with simple construction.

It will be appreciated by those skilled in the art that the foregoing description has been made to the drawings and various changes and modifications may be made without departing from the scope of the present invention which is to be defined by the appended claims.

What is claimed is:

1. A structure of a vibration-proof rubber bushing, comprising:
    a) a cylindrical metallic outer envelope coated with a rubber member at an outer periphery thereof and having a bottom portion and an engagement pawl projected at a predetermined position of a side wall portion of an inner peripheral surface of said outer envelope;
    b) a viscous fluid filled in the outer envelope;
    c) a first elastic member with an outer part on which a metallic ring member is adhered; and
    d) a metallic inner envelope fitted into an inner portion of the outer envelope via the first elastic member and onto a part of an outer peripheral surface of said inner envelope where the first elastic member is adhered, seal projections being projected from the ring member, the ring member being engaged with the engagement pawl installed on the outer envelope, the outer envelope being drawn at its side wall portion opposing the seal projections so that the seal projections of the inner envelope are brought in close contact with the inner periphery of the outer envelope and the viscous fluid is completely sealed by the seal projections and the drawn side wall portion of the outer envelope.

2. A structure as set forth in claim 1, wherein the viscous fluid comprises a liquid.

3. A structure as set forth in claim 2, wherein the liquid is a silicone oil.

4. A structure as set forth in claim 1, which further comprises a second elastic member attached to an inner side of the inner envelope and into which an end of a rod shaped vibrating member is fitted.

5. A structure as set forth in claim 4, wherein the viscous fluid is filled in a space between the inner side of the outer envelope and the first elastic member.

6. A structure of a vibration-proof rubber bushing for a vehicle, comprising:
    a) a cylindrical outer envelope coated with a rubber member at an outer periphery thereof and having a bottom portion and an engagement pawl projected at a predetermined position of a side wall portion of an inner peripheral surface of said outer envelope;
    b) a liquid contained in the outer envelope; and
    c) an inner envelope into which a rod end of a vibrating member is inserted and fixed and fitted into the outer envelope via an elastic member adhered onto a part of an outer peripheral surface of said inner envelope, a ring member adhered to said elastic member being engaged with the engagement pawl projected from a side wall portion of said inner peripheral surface on the outer envelope and having seal projections, the outer envelope being drawn at its side wall portion opposing to the seal projections so that the seal projections are brought into close contact with the inner periphery of the outer envelope and the liquid is completely sealed by the seal projections and drawn side wall portion of the outer envelope.

7. A structure as set forth in claim 6, wherein the liquid comprises a silicone oil.

8. A structure as set forth in claim 7, wherein the vibrating member is a compression rod of a suspension of the vehicle.

9. A structure as set forth in claim 8, wherein said ring member has a plurality of seal projections which extend therefrom.

10. A structure as set forth in claim 9, wherein a part of the ring member between the plurality of projections is bent inwardly so as to receive the corresponding part of the outer envelope.

11. A structure of a vibration-proof bushing, comprising:
   a) a metallic outer envelope having a substantially U-shaped cross section and outer and inner peripheral surfaces, the outer peripheral surface thereof being coated with a first rubber member except at a predetermined portion of the outer peripheral surface which is bent inwardly and the inner peripheral surface having an engagement pawl projected from a predetermined position of the inner peripheral surface of a side wall portion thereof;
   b) a predetermined amount of viscous fluid; and
   c) a metallic inner envelope, fitted into the inner peripheral surface of the outer envelope and having a substantially U-shaped cross section and inner and outer peripheral surfaces, onto a side wall portion of the inner envelopes inner peripheral surface a second rubber member being adhered, onto the inner envelopes outer peripheral surface a third rubber member being adhered, the third rubber member having a predetermined part of an outer peripheral surface onto which a metallic ring member is adhered, the metallic ring member being bent inwardly and the inwardly bent portion thereof having at least two seal projections, the seal projections and the predetermined portion of the outer peripheral surface of the side wall portion of the outer envelope being drawn to bring the ring member and the predetermined portion into a close contact with each other, and a space in which the viscous fluid is filled being defined at least by the inner peripheral surface of the outer envelope, the third rubber member, and the engagement pawl.

* * * * *